(12) United States Patent
Martin et al.

(10) Patent No.: US 9,365,223 B2
(45) Date of Patent: Jun. 14, 2016

(54) SYSTEM AND METHOD FOR MONITORING RAILCAR PERFORMANCE

(71) Applicant: Amsted Rail Company, Inc., Chicago, IL (US)

(72) Inventors: Andrew H. Martin, West Chester, PA (US); William D. LeFebvre, West Chester, PA (US); Brent M. Wilson, Edwardsville, IL (US)

(73) Assignee: AMSTED RAIL COMPANY, INC., Chicago, IL (US)

( * ) Notice: Subject to any disclaimer, the term of this patent is extended or adjusted under 35 U.S.C. 154(b) by 26 days.

(21) Appl. No.: 13/842,427

(22) Filed: Mar. 15, 2013

(65) Prior Publication Data

US 2013/0342362 A1    Dec. 26, 2013

Related U.S. Application Data

(63) Continuation-in-part of application No. 12/861,713, filed on Aug. 23, 2010, now Pat. No. 9,026,281.

(60) Provisional application No. 61/661,661, filed on Jun. 19, 2012.

(51) Int. Cl.
*B61L 15/00* (2006.01)
*G01K 7/02* (2006.01)
(Continued)

(52) U.S. Cl.
CPC ........... *B61L 15/0027* (2013.01); *B60T 13/665* (2013.01); *B60T 17/221* (2013.01);
(Continued)

(58) Field of Classification Search
CPC ............ B61L 15/0027; B61L 15/0081; B61L 25/025; B61L 27/0094; G01K 7/023; B60T 17/221; B60T 13/665; B60T 14/228; B61H 13/02

USPC ..................... 701/1, 19; 340/870.16; 374/152
See application file for complete search history.

(56) References Cited

U.S. PATENT DOCUMENTS 3,718,040 A    2/1973 Freeman et al.
4,812,826 A    3/1989 Kaufman et al.
(Continued)

FOREIGN PATENT DOCUMENTS

EP    1548419 A1    6/2005
EP    2650191 A1    10/2013
(Continued)

OTHER PUBLICATIONS http://web.archive.org/web/20130206222004/http://lat-lon.com/gps-products/locomotive-monitoring-unit, http://web.archive.org/web/20130206221020/http://lat-lon.com/gps-products/solar-tracking-unit http://web.archive.org/web/20130205074831/http://lat-lon.com/gps-products-sensors Available on the Internet at least as early as Feb. 6, 2013.*

(Continued)

*Primary Examiner* — Mussa A Shaawat
*Assistant Examiner* — Yazan A Soofi
(74) *Attorney, Agent, or Firm* — Fox Rothschild LLP

(57) ABSTRACT

A system for monitoring operation of a railcar having one or more sensing units, mounted on the railcar, for monitoring operating parameters and or conditions of the railcar, and a communication management unit, in wireless communication with the sensing units, wherein the system can make a determination of an alarm condition based on data collected the sensing units. A temperature sensor device for use in such a system is also provided.

32 Claims, 6 Drawing Sheets

(51) Int. Cl.
*B61H 13/02* (2006.01)
*B60T 17/00* (2006.01)
*B60T 17/22* (2006.01)
*B61L 25/02* (2006.01)
*B61L 27/00* (2006.01)
*B61K 9/04* (2006.01)
*B60T 13/66* (2006.01)

(52) U.S. Cl.
CPC .......... *B60T 17/228* (2013.01); *B61H 13/02* (2013.01); *B61K 9/04* (2013.01); *B61L 15/0081* (2013.01); *B61L 25/025* (2013.01); *B61L 27/0094* (2013.01); *G01K 7/023* (2013.01); *B61L 2205/04* (2013.01)

(56) References Cited

U.S. PATENT DOCUMENTS

| | | | |
|---|---|---|---|
| 5,381,090 | A | 1/1995 | Adler et al. |
| 5,440,184 | A | 8/1995 | Samy et al. |
| 5,446,451 | A | 8/1995 | Grosskopf, Jr. |
| 5,503,030 | A | 4/1996 | Bankerstrom |
| 5,682,139 | A | 10/1997 | Pradeep et al. |
| 5,691,980 | A | 11/1997 | Welles et al. |
| 5,810,485 | A | 9/1998 | Dublin et al. |
| 6,161,962 | A | 12/2000 | French et al. |
| 6,179,471 | B1 | 1/2001 | Moretti et al. |
| 6,184,798 | B1 | 2/2001 | Egri |
| 6,301,531 | B1 | 10/2001 | Pierro et al. |
| 6,324,899 | B1 | 12/2001 | Discenzo |
| 6,339,397 | B1 * | 1/2002 | Baker ............ 342/357.64 |
| 6,441,324 | B1 | 8/2002 | Stimpson |
| 6,487,478 | B1 | 11/2002 | Azzaro et al. |
| 6,535,135 | B1 | 3/2003 | French et al. |
| 6,668,216 | B2 | 12/2003 | Mays |
| 7,336,156 | B2 | 2/2008 | Arita et al. |
| 7,688,218 | B2 | 3/2010 | LeFebvre et al. |
| 7,698,962 | B2 | 4/2010 | LeFebvre et al. |
| 8,212,685 | B2 | 7/2012 | LeFebvre et al. |
| 8,244,411 | B2 * | 8/2012 | Baker ............... 701/2 |
| 8,370,006 | B2 | 2/2013 | Kumar et al. |
| 8,672,273 | B2 | 3/2014 | Brown et al. |
| 8,751,290 | B2 | 6/2014 | Schullian et al. |
| 2005/0259619 | A1 | 11/2005 | Boettle et al. |
| 2006/0264221 | A1 * | 11/2006 | Koike et al. ........... 455/456.1 |
| 2007/0241610 | A1 | 10/2007 | Smith |
| 2008/0195265 | A1 * | 8/2008 | Searle et al. ............ 701/19 |
| 2009/0173840 | A1 | 7/2009 | Brown et al. |
| 2011/0270475 | A1 | 11/2011 | Brand et al. |
| 2011/0282540 | A1 | 11/2011 | Armitage et al. |
| 2012/0051643 | A1 | 3/2012 | Ha et al. |
| 2015/0083869 | A1 | 3/2015 | LeFebvre et al. |

FOREIGN PATENT DOCUMENTS

| | | |
|---|---|---|
| GB | 2295207 A | 5/1996 |
| JP | 05213195 A | 8/1993 |
| JP | 05343294 | 12/1993 |
| JP | 0815099 | 1/1996 |
| JP | 10217968 | 8/1998 |
| JP | 11192948 | 7/1999 |
| WO | 2005/105536 A1 | 11/2005 |

OTHER PUBLICATIONS

Printout of web pages found at http://lat-lon.com/ Available on the Internet at least as early as Sep. 23, 2013.

Printout of web pages found at http://www.skybitz.com/ Available on the Internet at least as early as Sep. 23, 2013.

Printout of web pages found at http://www.transcore.com/ Available on the Internet at least as early as Sep. 23, 2013.

Printout of web pages found at http://www.id-systems.com/ Available on the Internet at least as early as Sep. 23, 2013.

Printout of web pages found at http://www.microstrain.com/wireless/sensors Available on the Internet at least as early as Sep. 23, 2013.

International Search Report in related WO Application No. PCT/IB2013/03267, dated Apr. 23, 2015.

International Search Report in WO Application No. PCT/US2014/072380, dated Apr. 27, 2015.

* cited by examiner

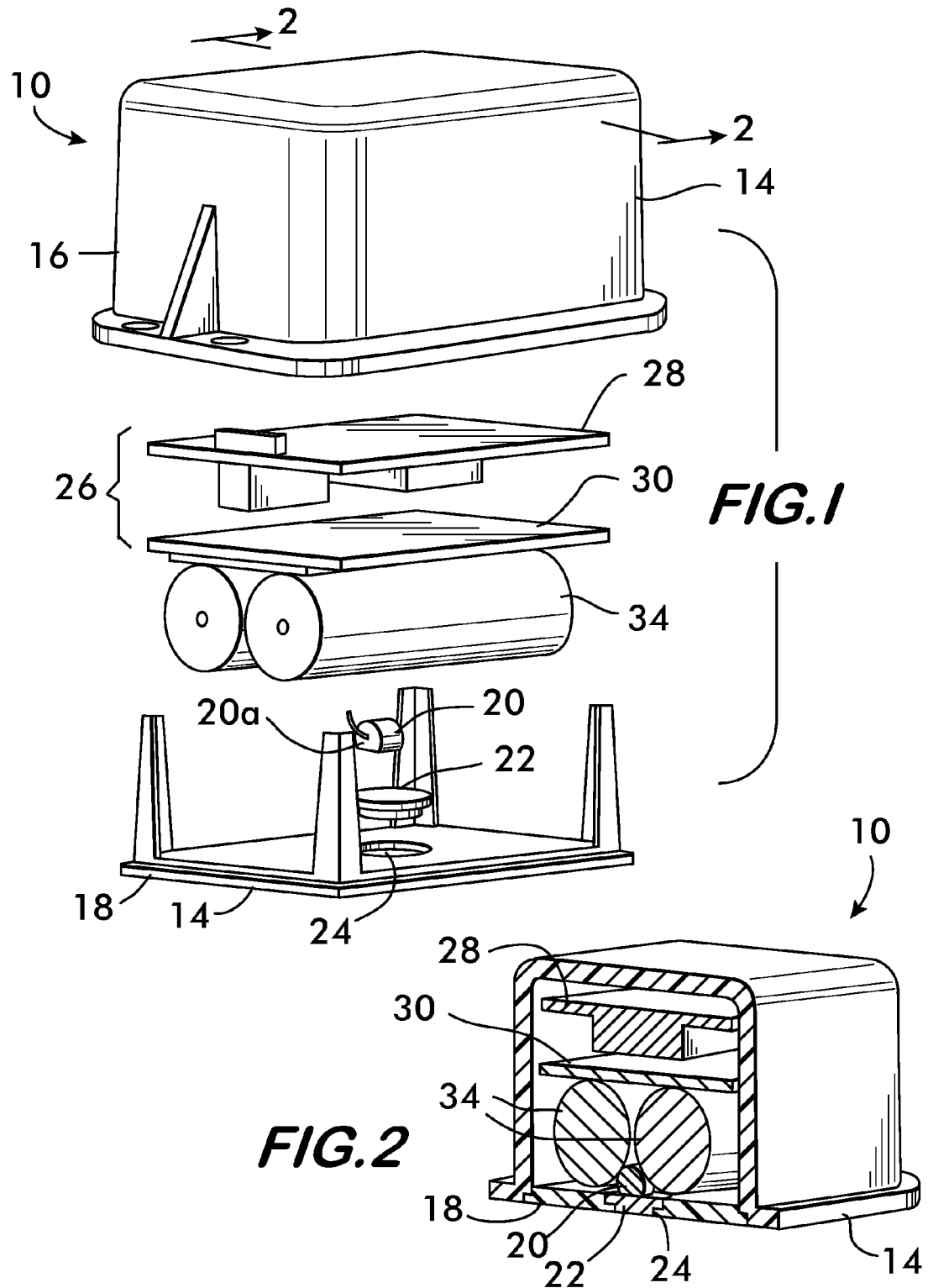

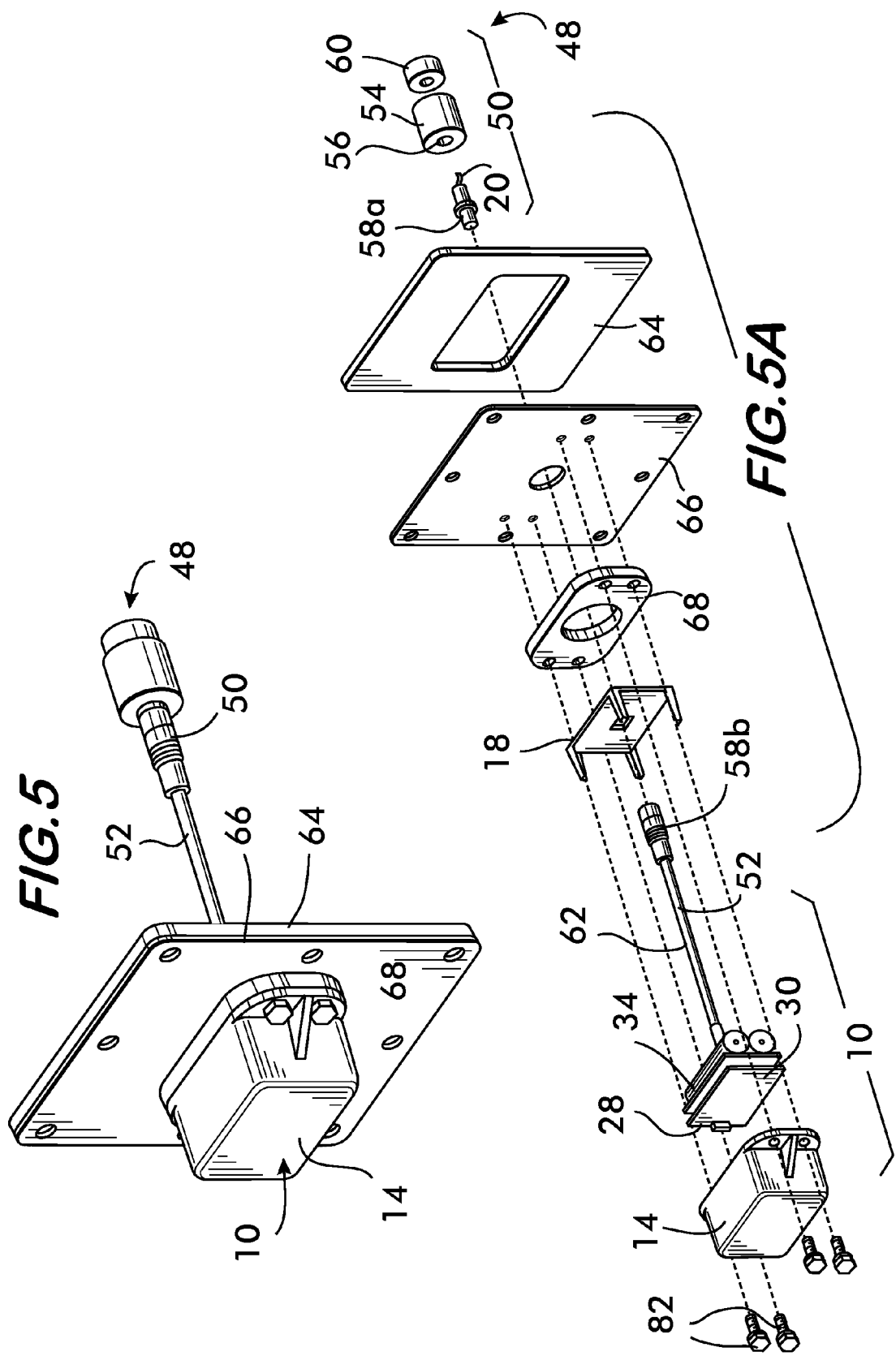

SYSTEM AND METHOD FOR MONITORING RAILCAR PERFORMANCE

RELATED APPLICATIONS

The application claims the benefit of U.S. provisional filing Ser. No. 61/661,661, filed Jun. 19, 2012 and is a continuation-in-part of pending U.S. patent application Ser. No. 12/861,713, filed Aug. 23, 2010, the disclosures of which are incorporated herein by reference.

FIELD OF THE INVENTION

This invention relates to a real-time monitoring and analysis system for railcars, and, more particularly, to a system that gathers data regarding various operating parameters and conditions from remote sensors and applies heuristics to analyze the data to detect and/or predict operational failures. Specific uses for monitoring temperatures on a railcar are also disclosed.

BACKGROUND OF THE INVENTION

To prevent incidents and improve efficiency, railcar owners and operators need an understanding of how their assets are performing. With heavier cars in service, there is a greater need to identify "bad actors" (cars which can damage track infrastructure and lead to derailments) as soon as their performance becomes unacceptable. There is also a need to increase average train speed by improving high speed performance and reducing unplanned service interruptions through mechanical failures. Car owners increasingly seek to implement preventative maintenance programs to predict and avoid mechanical failures in the field and to efficiently schedule repairs at a facility and time of their choice. Finally, with more automation of rail operations and increasing regulation to improve safety, the railroad industry needs new ways to monitor the performance of trains, cars and railcar trucks.

Even minor mechanical failures could lead very quickly to a catastrophic failure, not only of a single railcar, but of the entire train. Thus it is desirable to detect and report deviations from operational norms or predictions of impending failure to the locomotive or to a central data handling facility as quickly as possible, allowing for timely human intervention.

One approach in use in North America is the use of wayside defect detectors at fixed locations throughout the railroad network. Detectors measuring bearing temperature (hotbox detectors) are common, while other wayside detectors to measure wheel impacts, bearing condition (from acoustical signatures) and lateral forces are gradually being introduced. However, while one detector can monitor many freight cars as they pass, they can only provide a spot check on performance. It is quite possible that defects will only become apparent and escalate to a critical level between detectors.

Another approach to railcar performance monitoring has been to use on-board instrumentation. One such prominent system has been developed for the Federal Railroad Administration. In this and other similar systems, a number of instruments on different areas of a freight car are used to make discrete measurements before being communicated to a central hub on the freight car. While providing a superior solution to that provided by wayside monitors, wiring, complexity and costs increase the investment required to monitor the cars and decrease efficiency and reliability.

The current systems, however, lack the ability to apply heuristics to act on data gathered from more than one sensor or to detect operational deviations or trends which show deviations from nominal operating parameters. Furthermore, current systems are limited in that they lack the ability to apply such heuristics at multiple levels, for example, at the individual sensor level, at the railcar level, and at the train level. Lastly, current systems lack the ability for sensors to efficiently and reliably communicate their data to a central data gathering facility using a wireless communications infrastructure that has multiple redundancies and which allows communication of data between individual sensors.

Therefore, it would be desirable to have a system which addresses these current deficiencies and which improves (1) the ability to reliably collect and utilize data from multiple sensors on each railcar; (2) the ability to analyze collected data by the application of heuristics to detect and predict operational deficiencies; and (3) the ability to determine the severity of detected conditions to determine if immediate alarms should be raised to facilitate human intervention.

SUMMARY OF THE INVENTION

The present invention has the objective of providing means for monitoring the output from a variety of sensors attached to a railcar and determining the behavior and condition of the railcar and its various components based on an analysis of this data. This provides regular assurance of proper performance and condition as well as necessary warnings of impending or actual failure in a timely and useful manner to the operators and owners of the train.

Some of the performance criteria that is useful to monitor, for example, include roller bearing temperature, temperature of the commodity being carried, position of the hand brake, roller bearing adapter displacement, wheel condition, truck hunting/warp/binding, brake status and performance, load status and load amount, whether a partial derailment has occurred and potentially problematic track conditions.

Given the demanding environment in which railroad trains operate, any monitoring system must be rugged, reliable and able to operate for long periods with little or no maintenance. In addition, to be cost effective, it should not add significant cost to install, maintain or operate the system. Because there are more than 1.5 million freight cars in North America alone, a system of monitoring all cars in use is highly desirable and, as such, the system needs to be able to deal with a very large number of potential devices.

In one embodiment of the invention, sensing units or devices, herein referred to as "motes", are deployed at various locations around the railcar. The motes can include a sensor, a power source, circuitry to read the sensor and convert the readings to a digital form, and communication circuitry which allows the mote to wirelessly transmit the sensor readings to an external receiver. In some instances, a mote may also have the capability to perform low-level analysis of the data to determine if an alarm needs to be raised, and the ability to communicate the alarm to an external receiver.

Each railcar also can be equipped with a communication management unit (CMU) which communicates with each of the motes deployed on the railcar. The CMU is capable of wirelessly collecting data from each of the motes and performing higher-level analysis of the data to detect imminent or actual failures. During such data analysis, heuristics may be applied to determine potential failures based on statistical models and empirical data. The CMU is also capable of communicating both the data and the results of any analysis to a receiver remote from the railcar.

The remote receiver may be located on the locomotive or other central location on the train, or may be off-train. The remote receiver may also be able to perform higher-level analysis of the condition of the train by applying heuristics and statistical models to data collected from a plurality of CMUs, located on different railcars in the train. The analysis of the data collected can be carried out at any of the different event engines distributed among the various components in the present invention, including the sensor units, CMU, and mobile or land base stations.

It is therefore an objective of this invention to provide a comprehensive system which allows the wireless collections of data and the analysis of that data to predict operational failures and to provide adequate warning of those failures to allow for human intervention before a catastrophic failure occurs.

It is another object to provide specific sensor applications, such as temperature sensors that can monitor the temperature of various components and items on the railcar.

The discussion which follows describes the system as in the context of a freight car, however, it will be understood by one of skill in the art that the same methods are applicable to any railroad vehicle. Furthermore, while the description which follows features a freight car with two trucks (or bogies), it is applicable to any configuration with more or less trucks or axles.

BRIEF DESCRIPTION OF THE DRAWINGS

FIG. 1 is an exploded perspective view of a mote in accordance with the present invention;

FIG. 2 is a cross sectional view of the mote shown in FIG. 1;

FIG. 5 is a view of an alternative temperature sensor mote;

FIG. 5A is an exploded view of the sensor mote of FIG. 5 shown with components for mounting to the railcar;

DETAILED DESCRIPTION OF THE EMBODIMENTS

Figure 3:
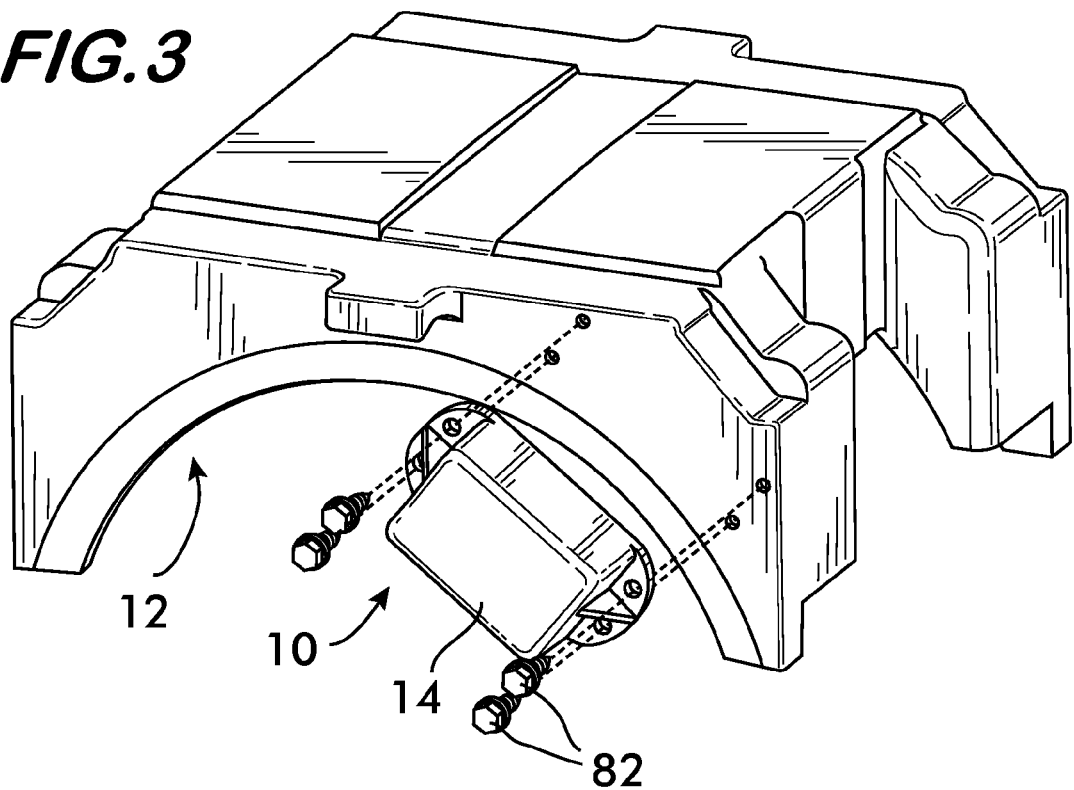
FIGS. 3 and 3A are views of the mote of FIG. 1 shown mounted on a railcar bearing adapter.

In broad terms, a novel means for monitoring the performance and operation of a railcar is provided. This includes a system for monitoring the railcar and sensors mounted on the railcars for use with the system. These sensors communicate with a communication management unit preferably mounted on the railcar. The sensors monitor and/or collect data on particular parameters and conditions of the railcar. If a problem is detected, alarms can be forwarded for further action. The sensors are describe below with an exemplary sensor directed to monitoring temperature. This is followed by a detailed description of the monitoring system using the sensors.

In a preferred embodiment of the invention, the sensors are contained and deployed in a self-contained housing which generally includes the sensor, long-life batteries, a processor board and communications unit. As previously mentioned, these remote units are referred to herein as "motes". The motes can be configured for the parameter or condition to be monitored, and can be placed on the train in the location chosen for such monitoring.

With reference to FIGS. 1, 2, 3 and 3A, an exemplary mote 10 is now described. In this particular embodiment, the mote 10 is configured to be mountable to the surface of bearing adapter 12 of a railcar for monitoring the temperature of the wheel bearing. The mote 10 has a housing 14 having a first or lid section 16 and a second or base section 18. Preferably, the housing sections 16 and 18 are composed of a hard plastic resistant to environmental damage, such as a UV rated polymer, e.g., a polycarbonate/ABS blend, and when fully assembled is weatherproof. After the various components are installed within the housing 14 as described below, a potting material (not shown) is provided through openings in the housing 14 to maintain, encapsulate and environmentally seal the components within. Any suitable electrical potting material capable of protecting the electric circuitry and components from the harsh railroad environment can be used, where harsh weather, UV exposure, humidity, vibration, mechanical impact, thermal shocks and abrasion might occur while the device is in operation. Such materials include epoxies, polyurethanes and silicone compounds. A flexible urethane suitable for electrical use and through which wireless signals of the frequencies to be used can be transmitted is preferred.

A sensor 20 configured for monitoring the desired parameter or condition may be mounted within the housing 14 or may be external to the mote and be electrically connected thereto. FIGS. 1 and 2 show a temperature sensor 20a, which is thermally coupled to heat transfer element 22 which extends through an opening 24 in the housing 14, a preferred heat transfer element 22 being a brass plug as shown. The thermal transfer element 22 is thermally coupled to the sensor 20 via a thermal epoxy. This configuration is preferred for monitoring the surface temperature of the item to which the mote is attached since the heat transfer element 22 will contact the surface on which the mote is attached. A preferred temperature sensor is a silicon temperature sensor which is ideal for electronic circuits. In this embodiment, the mote 10 will be mounted to place the brass plug 22 in thermal communication with the portion of the railcar for which a temperature reading is desired. As one of ordinary skill would recognize, the configuration of the motes 10 with respect to the sensor 20 is dependent upon the type of sensor and the type of data desired. Sensor 20 can be any type of sensor, including for example, a temperature sensor, a pressure sensor, a load cell, a strain gauge, a hall effect sensor, a vibration sensor, an accelerometer, a gyroscope, a displacement sensor, an inductive sensor, a piezio resistive microphone or an ultrasonic sensor. In addition, the sensor may be a type of switch, including, for example, reed switches and limit switches. An example of another type of mote sensor which uses a strain gauge, e.g. a hand brake monitor sensor, is described in U.S. patent publication 2012/0046811 (U.S. patent application Ser. No. 12/861,713 filed Aug. 23, 2010), the disclosure of which is hereby incorporated herein by reference.

Electrical circuitry 26 is provided for the operation of the mote 10. The electrical circuitry 26 includes the components and wiring to operate and/or receive and process the signals from the sensor 10. This can include, but is not limited to, analog and digital circuitry, CPUs, processors, circuit boards, memory, firmware, controllers, and other electrical items, as required to operate the temperature sensor and process the information as further described below. In the illustrated embodiment, the circuitry 26 is in electrical communication with the temperature sensor for receiving signals therefrom. Two circuit boards are provided connected to one another via a header, as further discussed below.

The circuitry 26 includes a main board 28 which includes the communications circuitry, antennae and microprocessor and a daughter board 30 including the circuitry to read the data from the sensor 10 and may perform analog to digital conversion of the data and also may include power conditioning circuitry. Main board 28 may also include intelligence sufficient to perform low-level analysis of the data, and may accept parameters from outside sources regarding when alarms should be raised. For example, for the mote 10 shown in FIGS. 1 and 2, with a temperature sensor 20, may be programmed to raise an alarm when the sensed temperature exceeds a certain threshold for several consecutive readings.

The main board 28 also includes circuitry for wireless communications. Preferably, each mote 10 on a railcar is formed into an ad-hoc mesh network with other motes 10 on the same railcar and with a Communication Management Unit (CMU) 32, also preferably mounted on the same railcar 38 (see FIG. 6). In the preferred embodiment, each mote 10 would transfer its data to the CMU 32 mounted on the same railcar. This transfer of data may occur directly or the data may be relayed by other motes in the mesh network to the CMU 32. The ad-hoc mesh network is preferably formed using the Time Synchronized Mesh Protocol, a communications protocol for self organizing networks of wireless devices.

Mote 10 also includes a long-term power source 34, preferably a military grade lithium-thionyl chloride battery. Daughter board 30 includes power conditioning and management circuitry and may include a feature to conserve battery life which keeps mote 10 in a standby state and periodically wakes mote 10 to deliver readings from sensor 20.

Figure 4:
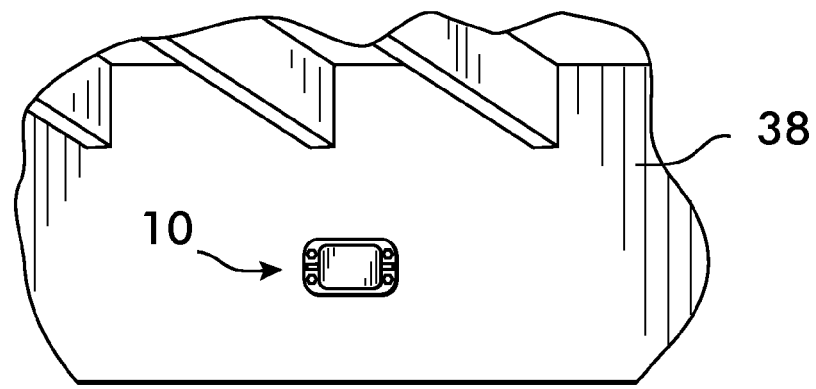
FIG. 4 is view of a mote, configured as a temperature sensor, mounted on a railcar to obtain ambient air temperature readings.
Figure 3A:
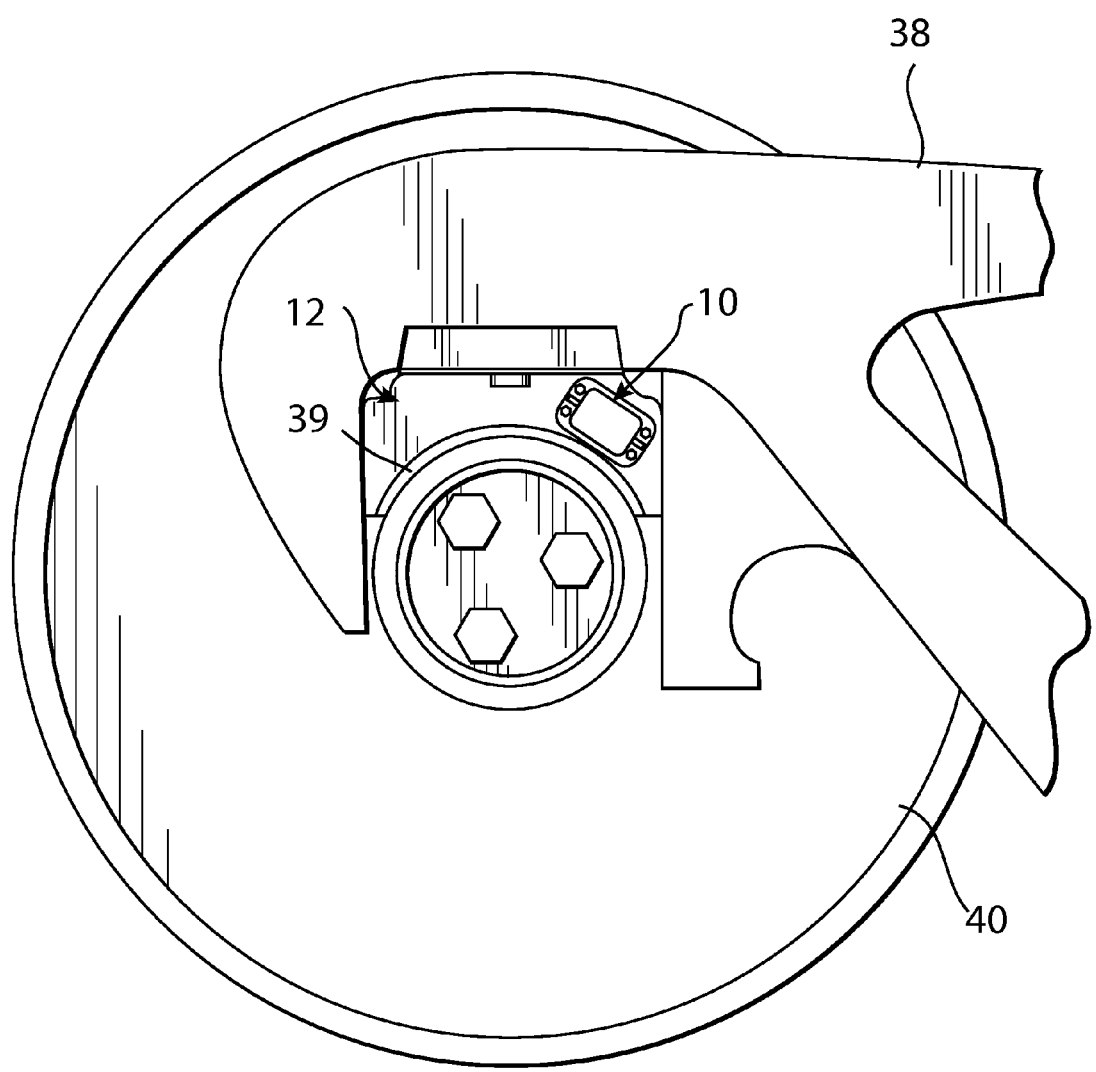

The individual motes 10 are mounted on the areas of interest on a railcar 38. As an example, FIGS. 3 and 3A show a temperature sensing mote 10 of the type described above mounted to a bearing adapter 12 of a railcar wheel bearing 39 of a railcar. The unit may be attached using a thermally conductive epoxy adhesive between the brass plug 22 and the adapter 36 to ensure good heat transfer to the temperature sensor and mechanical fasteners such as self tapping screws to hold the mote 10 in place. In this particular example, motes 10 may be attached to all 8 wheel bearing adapters 12 of each railcar wheel 40. In addition, an ambient temperature sensor mote 10 may also be mounted on an area of the railcar 38 receiving free airflow. FIG. 4 shows a mote 10 mounted on the body of a railcar 38 for monitoring the ambient temperature. The device electrical circuitry 26 obtains information related to the temperature being monitored, e.g., a bearing or ambient. Since the temperature sensor is not in direct contact with the bearing, but the bearing adapter, the device is calibrated so that the temperature reading is indicative of the bearing temperature. This calibration takes into account the temperature of the bearing adapter at the point measured (see FIG. 3a), the ambient temperature as measured by the second temperature sensor mote mounted elsewhere on the rail car so as to sense ambient temperature (see FIG. 4), and information about the type of bearing adapter (different models have different sizes and configurations). Calibration information for use by the circuitry 26, such as a calibration algorithm, can be developed with suitable testing. Bearing temperature information that constitute various alarm states can also be provided to the circuitry 26, preferably stored thereon, allowing the device 10 to monitor the bearing temperature and, based on the ambient temperature, determine the bearing temperature and take action as desired. On a typical railcar 38, there will be eight sensors 10, one on each bearing adapter 12 (at each wheel 40); and one sensor 10 placed to measure ambient temperature. The ambient temperature sensor 10 will communicate the ambient temperature to the CMU, which provides this information to the sensors at the bearing adapters as they call for the information. This will allow the sensors 10 at the bearing adapter 12 to determine the bearing temperature and then determine if further action is required, such as communicating an alarm of high temperature. Again, time Synchronized Mesh Protocol, a communications protocol for self-organizing networks of wireless devices, is preferred to communications between the devices 10 and the CMU 32.

Figure 5B:
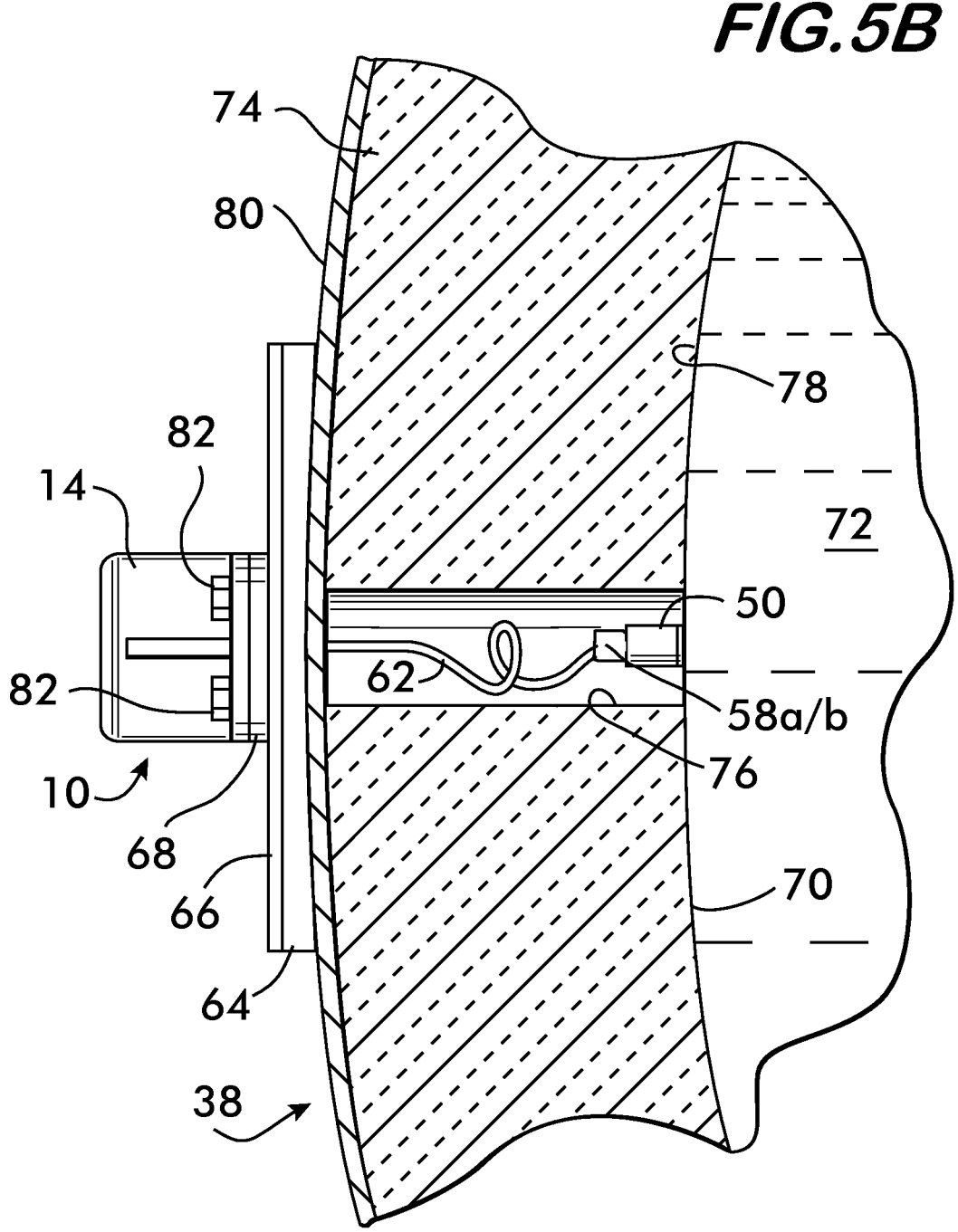
FIG. 5B is a schematic view of the sensor mote of FIG. 5 shown in use with a tank railcar.

An alternative temperature sensor mote 10 is illustrated with reference to FIGS. 5, 5A and 5B showing a mote 10 for monitoring the temperature of a part of the railcar spaced from the housing 14 of the mote 10. For example, it may be desirable to monitor the temperature of a commodity stored in a vessel or the temperature inside of a container by monitoring the temperature of the vessel or container wall, but a mote 10 as described above for attaching directly to the surface to be monitored is not suitable. Here the mote 10 is constructed the same as that described above but with the temperature sensor 20 positioned in a probe 48 spaced from the housing 14. The temperature sensor 20 sits within a sensor probe head 50 electrically attached to the housing 14 via wires 52. The head 50 is preferably cylindrical having a ring shaped head body 54 made of a thermally conductive material such as stainless steel. Fitting within a head body opening 56 is the temperature sensor 20 electrically attached to an electrical connector 58a. A ring shaped magnet 60 with an opening in its center fits around the sensor 20 within the head 50. Thermally conductive epoxy or other suitable potting material seals the magnet 60 and temperature sensor 20 within the body 50 and ensures good heat transfer to the sensor 20. A corresponding electrical connector 58b connected to corresponding connector 58a connects temperature sensor 20 via wire 52, preferably a flexible PVC coated cable 62, to the mote housing 14. To aid in the mounting of this housing 14, a silicon gasket 64, metal mounting plate 66, and housing silicon mounting gasket 68 are provided. The mote 10 continuously monitors the commodity temperature and alerts when specific criteria are met such as rapid temperature change, temperature thresholds exceeded, etc.

As an example of such a device and a method of installing the device, shown in FIG. 5B representing a liquid holding tank 70 of a rail tank car 38, the temperature mote 10 with the spaced probe 48 can be used to monitor the temperature of a liquid 72 stored within the tank 72 on a rail tank car 38 that is covered with a fairly thick insulation jacket 74 having an outside cover 80. Here, a small opening 76, about 2" diameter, can be cut into the jacket 74 allowing the probe head 50 to be attached to the cleaned outside surface 78 of the vessel 70 with thermally conductive epoxy. The magnet 60 within the head 50 helps hold the probe 48 in place while the epoxy cures. The housing 14 of the mote 10 is mounted on the outside of the jacket cover 80, connected to the head 50 vial the cable 62 which can be coiled if necessary to fit within the opening 76. To attach the housing 14 to the jacket cover 80, the silicone gasket 64 is placed against the jacket cover 80 over the opening 76, followed by the metal mounting plate 66, followed by silicone gasket 68, the gaskets 64 and 68 ensuring a good weather seal of the housing 14 to the jacket cover 80. The metal mounting plate 60 is screwed or bolted to the jacket cover 80, and the mote housing 14 is screwed to the mounting plate 66 with screws 82. Calibration of the mote circuitry ensures an accurate temperature reading of the liquid 72 within the vessel 70, and ambient temperature, monitored from another sensor 10, can be used to calculate accurate temperature readings.

Figure 6:
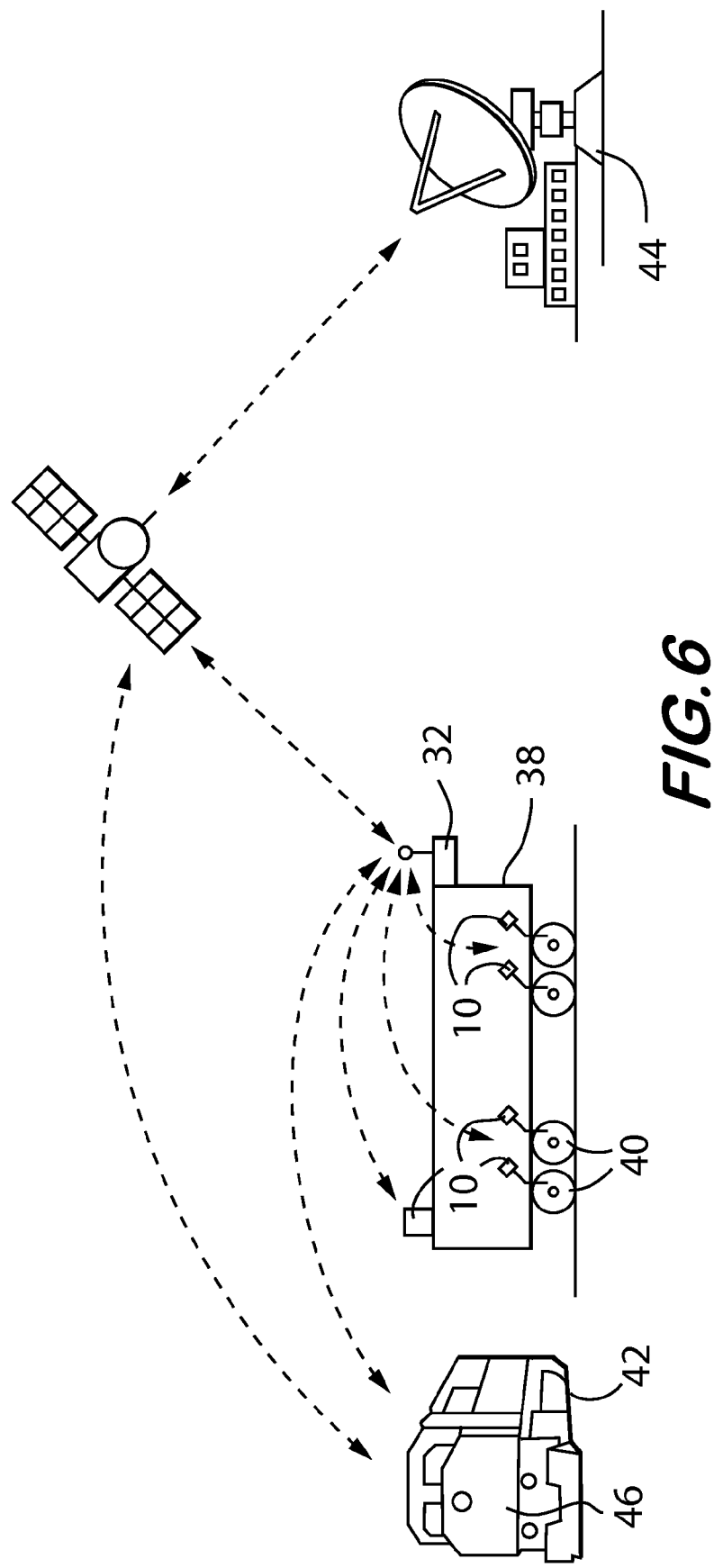
FIG. 6 is a schematic diagram showing the communications pathways in accordance with the primary embodiment of the invention.

To communicate data collected by the motes 10, each mote is in two-way communication with a CMU 32 mounted on the railcar 38, which collects data from each mote and can also send instructions to the motes, as shown in FIG. 6. As previously stated, CMU 32 and each of the motes 10 connected to the same railcar 38 form a local area ad-hoc mesh network, to facilitate communications therebetween. The term "Communication Management Unit" or "CMU" as used herein means any device capable of receiving data and/or alarms from one or more motes 10 and capable of transmitting data and alarm information to a remote receiver. CMU 32 is preferably a single unit that would serve as a communications link to other locations, such as a mobile base station 42 (e.g., the locomotive 46), a land-based base station 44, etc, and have its own circuitry, CPUs, processors, memory, power source, etc. to process the data received. In a preferred embodiment, it can also communicate with, control and monitor motes 10 on the railcar 38.

CMU 32 is capable of performing advanced data analysis, using data collected from multiple motes 10, and may apply heuristics to draw conclusions based on the analysis. The chart below contains examples of the types of mote sensors 10 and high level descriptions of the heuristics applied to analyse the data.

| Parameter Sensed | Sensor Type | Output | Heuristic |
| --- | --- | --- | --- |
| Adapter Temp. | Temperature Sensor | Bearing Temp. | Adapter temperature is correlated to bearing cup temperature using empirical data. |
| Hatch Position | Reed Switch | Hatch open/close | Determine open/closed state dependent upon state of switch. |
| Pressure | Pressure Transducer | Brake pressure | The pressure transducer is fitted directly to the trainline for measuring pressure. |
| Handbrake Link Strain | Strain Gauge | Handbrake On/Off | Handbrake link strain is correlated to the ON/OFF status of the handbrake. |
| Bolster Displacement | Hall Effect Sensor | Car Load | Bolster/side frame displacement is measured and spring stiffness data is used to convert displacement to load. |
| Bolster position | Reed Switch | Car Empty/Full | The relative position of bolster/sideframe is measured. The LOADED position is determined using empirical data or spring stiffness. |
| Inner Jacket Temp. | External Temperature Sensor | Tank Car Commodity Temp. | Inner jacket surface temperature on a tank car is determined and commodity temperature can be estimated using theoretical conduction/convection laws. |
| Bolster Position | Limit Switch | Car Empty/Full | A limit switch is mounted to the sideframe and activated when the bolster/sideframe position is in the loaded state. |
| Sill Acc. | Accelerometer | Coupler Force | Impact data is collected. Using empirical data, a modal influence matrix can be computed for different coupler types that relates the impact data to the output. Using an FFT on the sampled data, and multiplying by the inverse of the modal matrix yields the input in the frequency domain. This input can be converted to the time domain to yield the coupler force. |
| Adapter Acc. | Accelerometer | Bearing Fault Indicator | An adapter mounted accelerometer can be used to sample dynamic bearing data. An FFT can be used on data sets and plotted over time to isolate dominant modes and any shifting or relative amplification. Amplification at rolling frequency indicates a likely fault. |

-continued

| Parameter Sensed | Sensor Type | Output | Heuristic |
|---|---|---|---|
| Radial Axle Acc. | Accelerometer | Vehicle Speed | An axle mounted accelerometer can be used to measure radial acceleration. The radial acceleration can be converted to vehicle speed using simple dynamics using the wheel and axel diameters. |
| Adapter Acc. | Accelerometer | Bearing Fault | An adapter mounted accelerometer can be used to sample dynamic bearing data. Kurtosis can be computed as an indicator of bearing damage. Kurtosis is measured in the time domain and requires computation of a probability density function. |
| Adapter Acoustics | Piezio-electric sensor, microphone, and accelerometer | Bearing Fault | Sampled acoustic data can be used for either an acoustic noise response or Acoustic Emission which is ring-down counts and amplitude. Empirical data from defective bearings is needed. |
| Temp. | Temperature sensor | Commodity/Fluid Pressure | A temperature sensor can be used to measure surface temperature of a pressure vessel (Tubing, tank, etc.). Heat conduction equations can be used to convert the surface temperature to fluid temperature. Using published data for the working fluid, the temperature can be converted to pressure. |
| Displ. | Displacement Sensor | Coupler Force | Coupler displacement is measured and correlated to force using force-closure curves. |
| Axle RPM | Inductive Type Sensor | Vehicle Speed | An inductive proximity sensor facing the axle can generate a signal in response to an exciter ring on the axle, and converted to vehicle speed using wheel and axle diameters. |
| Adapter Acc. | Accelerometer | Track Damage Detection | Sensor is mounted on an adapter or other truck component to sample dynamic data. A Probability Density Function and Kurtosis can be computed from the data. High Kurtosis, or impulsivity, will indicate track defects. A transfer function relating the wheel input to the adapter is needed, and can be determined empirically or by creating a theoretical model. |
| Adapter Acc. | Accelerometer | Truck Hunting Detection | Sensor can be mounted on an adapter or other truck component to sample dynamic data. A simple algorithm could use an FFT to isolate known hunting frequencies. More sophisticated algorithms could detect flange impacts using time-series data. |

-continued

| Parameter Sensed | Sensor Type | Output | Heuristic |
|---|---|---|---|
| Wheel Temp. | IR Temperature Sensor | Wheel Tread Temp | Wheel temperature is correlated to tread temperature using empirical data. |
| Proximity | Ultrasonic Sensor | Empty/Full status | An ultrasonic sensor could be used to detect the presence of lading in tank-cars, box-cars, covered hoppers, etc. |
| Strain | Load Cell | Car Load | Load cell on multiple places of the truck. |
| Displ. | Reed Switch | Handbrake On/Off | Position of a handbrake chain is determined and correlated to On/Off Status. |
| Bolster Acc. | Accelerometer | Truck tilt angles | Using a 3-axis accelerometer fixed to a bolster, the gravitational field can be used to measure the respective roll, pitch, and yaw angles with respect to fixed-earth coordinates. |
| Hatch Acc. | Accelerometer | Hatch Tilt | Accelerometer measures the relative tilt of hatch with fixed-earth coordinates. |

As shown in FIG. 6, CMU 32 also communicates data and alarms to a remote location, either a mobile base station 42 located on the train, usually in the locomotive, or to a stationary, land-based base station 44, or both. Data and/or alarms may be relayed from land-based base station 44 to the mobile base station 42. CMU 32 may be in constant wireless or wired communication with the mobile base station 42, which may communicate with the land-based base station 44 via the cellular network, via satellite, or via any number of other well known means.

Data collected from motes 10 may be sent to base station 44 for analysis and further action. The heuristics shown in the chart above may be performed by either mobile base station 42 or land-based base station 44. In addition, either station 42, 44 may utilize train-wide heuristics to predict train-wide failures, or to spot train-wide trends, which a single CMU 32 may be unable to do with data from only a single railcar 38.

When an alert is detected, it is preferably sent to a display unit in the locomotive 46 or at the land-based base station 44. Any typical display unit of a type that would be mounted in a mobile base station 42, such as in a locomotive, may be used. Communications devices as known in the art communicate with base station 44 via satellite, and display units display the alert to the locomotive engineers. Incoming alerts may appear on the display and are accompanied by an audible alarm which must be acknowledged and cancelled by the driver. Each type of alert is accompanied by a recommended practice that the locomotive driver should take when an alert appears, based on the needs of the particular rail network. The action required to be taken by the locomotive driver varies based on the severity of the alert. Alerts may also be sent via email or posted to a web site.

Setting locomotive alarm thresholds at values that are sub-critical will likely lead to an excess of stoppages and delays. As such, alert messages are selected such that only actionable messages are sent to the locomotive 46, meaning that only those alarm levels that require the crew to take action are typically transmitted to the locomotive crew. In addition, rather than requiring the train to be stopped on the mainline, some alerts could be addressed by putting operating restrictions in place. For example, speed restrictions can be placed on the operation of the train at tiered alarm levels so that the train would be allowed to proceed to a siding or other appropriate stoppage point, allowing other traffic to continue on the mainline without inordinate delays or costs. Low level (Level 1/Stage 1) alerts, however, can still be monitored at base station 44 to make determinations about repeat temperature offenders and/or trending events that would signify an impending problem, although not imminent.

As an example of operation, consider the monitoring of wheel bearings. The goal is to monitor bearings in motion, therefore, data that is collected while the railcars 38 are motionless does not contribute to determining the condition of the bearing. To save power and limit the uninformative temperature information, data may be suppressed when the railcar was not moving. As such, data is only stored in CMU 32 and transmitted to the base station 42, 44 when useful data is found. Three conditions that might define "interesting" or "useful" data include:

1. 'Differential Condition' events;
2. 'Above Ambient Condition' events; and
3. 'Node Temp Anomalies'.

A Differential Condition event exists when the difference across any axle is greater than or equal to a specified variable.

An Above Ambient Condition event occurs when any bearing temperature exceeds the value reported from the Ambient Temperature Node by a specified constant.

A Node Temp Anomaly occurs when any data channel, bearing or ambient, does not report valid temperatures even though other channels are collecting data well past the corresponding time period. The delay allows the system a chance to recover from possible communication errors. CMU 32 will continue to gather and save temperatures from the other bearings, even if a full data set should have been gathered and one or more channels are missing data.

The data suppression is confirmed by seeing all temperature data converge to ambient (train has stopped) before logging stops. Divergent temperatures show the bearings are generating heat again and the train has started moving.

Levelled Alarms and Responses

These are examples of various levels of alarms, based on severity, and the appropriate response:

Stage 1: "Bearing Temp Alarm"
  Alarm to base station only
  Used for trending recommendations and repeat offender identifications Stage 2: "Axle Differential Alarm": is the condition any bearing that is a predetermined amount hotter than its axle mate
  Action: Stop train, check journal of alarming bearing. Look for any sign that the bearing is "walking off" the axle, grease is being purged, or the bearing has been damaged.
  Proceed at predetermined reduced maximum speed until a stage 2 "alarm clear" message is received at the locomotive terminal
  If stage 2 "alarm clear" message is received at the locomotive terminal, proceed as normal Stage 3: "Above Ambient Alarm": is when any bearing is at a temperature a predetermined amount above ambient
  Action: Stop train, check journal of alarming bearing. Look for any signs that the bearing is "walking off" the axle, grease is being purged, or the bearing has been damaged.
  Proceed at predetermined reduced maximum speed until stage 3 "alarm clear" message is received at the locomotive terminal, at which point speed can be increased
  If the alarm message does not clear, a choice can be made to remove and change the bearing at an appropriate stoppage point; otherwise, reduced speeds are required to reduce the chance of a screwed journal or catastrophic bearing failure
  If Stage 2 and Stage 3 "alarm clear" messages are both received at the locomotive terminal, proceed as normal Stage 4: "Critical Alarm": this is the absolute alarm set at a predetermined bearing temperature
  Action: Stop train, remove bearing Advanced Algorithms—

Improvements to the alarms can be made based on statistical models of bearing temperature behaviour. The following section details examples of advancements to the existing data analysis as it pertains to identifying bearings that are on the "watch list" for degrading/trending condition.

Level 2 Algorithms

The Level 2 algorithms use temperature data that had been collected every minute while the railcar had been moving during a period of days directly preceding this analysis.

When at least four of the following five criteria are flagged for the same bearing, an alert may be sent to the customer to schedule maintenance for that bearing.

Criteria 1—Peak Analysis: Count the percentage of bearing temperature values>a predetermined value
  For each bearing, count the number of temperature readings that occur above a predetermined value
  Flag any bearing with a certain percentage of temperature values>a predetermined value Criteria 2—Above Ambient Analysis: Count the percentage of bearing temperature values>a defined value above ambient
  For each bearing, count the number of temperature readings that occur over a defined value above ambient
  Flag any bearing with a certain percentage of temperature values>the defined threshold Criteria 3—Deviation from Wagon Average Analysis: Calculate the average bearing temperature and standard deviation of each bearing compared to the average of bearing temperatures for the rest of the wagon
  Calculate the average temperature over the time span for each bearing and the wagon average
  Calculate the standard deviation on each bearing temperature from the wagon average
  Flag any bearing with a certain standard deviation Criteria 4—Deviation from Fleet Average Analysis: Calculate the average bearing temperature and standard deviation of each bearing compared to the average of bearing temperatures for the rest of the fleet
  Calculate the average temperature over the time span for each bearing and the fleet average
  Calculate the standard deviation on each bearing temperature from the fleet average
  Flag any bearing with a certain standard deviation Criteria 5—Heating Rate of Change Analysis: Calculate the percent of operating time that a bearing is heating quickly
  Calculate a linear fit to a moving window of temperature data
  Count the number of instances where the slope of the linear fit is above a certain threshold
    Flag any bearing with >a certain amount of the operating time having a slope of the linear fit>the threshold Level 3 Algorithms The Level 2 algorithms use temperature data that has been collected every minute while the railcar is moving for the previous 30 days directly preceding this analysis. When a bearing is ranked in the top five percent for at least four of the five criteria, an alert is sent to the customer to schedule maintenance for that bearing.

Criteria 1—Peak Analysis: Count the percentage of bearing temperature values>a predetermined value
  For each bearing, count the number of temperature readings that occur above a predetermined value
  Rank the bearing in a league table with the rest of the fleet
  Flag the top percent of bearings in the fleet Criteria 2—Above Ambient Analysis: Count the percentage of bearing temperature values>a defined value above ambient
  For each bearing, count the number of temperature readings that occur over a defined value above ambient
  Rank the bearing in a league table with the rest of the fleet
  Flag the top percent of bearings in the fleet Criteria 3—Deviation from Wagon Average Analysis: Calculate the average bearing temperature and standard deviation of each bearing compared to the average of bearing temperatures for the rest of the wagon
  Calculate the average temperature over the time span for each bearing and the wagon average
  Calculate the standard deviation of each bearing temperature from the wagon average
  Rank the bearing in a league table with the rest of the fleet
  Flag the top percent of bearings in the fleet Criteria 4—Deviation from Fleet Average Analysis: Calculate the average bearing temperature and standard deviation of each bearing compared to the average of bearing temperatures for the rest of the fleet Calculate the average temperature over the time span for each bearing and the fleet average Calculate the standard deviation on each bearing temperature from the fleet average Rank the bearing in a league table with the rest of the fleet Flag the top percent of bearings in the fleet Criteria 5—Heating Rate of Change Analysis: Calculate the percentage of operating time that a bearing is heating quickly Calculate a linear fit to a moving window of temperature data Count the number of instances where the slope of the linear fit is >a certain threshold Rank the bearing in a league table with the rest of the fleet Flag the top percent of bearings in the fleet In another alternate embodiment of the invention, one or more motes may be housed in alternative housings or built in to the railcar itself. In one such embodiment, motes can be built into the form of an adapter pad similar to the type shown in U.S. Pat. Nos. 7,698,962 and 7,688,218, the disclosures of both of which are incorporated herein by reference, which could be adapted for use with the present invention.

Various embodiments of the invention have been described in the context of various examples, however, the invention is not meant to be limited in any way. As one of skill in the art recognizes there may be many implementations that are within the scope of the invention, as is described in the following claims.

We claim:

1. A sensor device for monitoring temperature on a railcar, comprising:
  a housing mountable on a railcar;
  a temperature sensor;
  electrical circuitry in communication with said temperature sensor for obtaining information regarding the temperature being sensed, said electrical circuitry positioned within said housing;
  a power source electrically connected to said electrical circuitry for providing power thereto, said power source positioned within said housing;
  a probe external to said housing and which probe includes said temperature sensor and a magnet positioned to magnetically attract the part of the railcar against which the probe will be placed; and
  a communication device capable of broadcasting information regarding the temperature sensed, said communication device positioned within said housing;
  wherein the power consumption of said sensor device is managed by placing said sensor device in a standby state and periodically awakening said sensor device to collect readings from said temperature sensor and to transmit the information regarding the temperature sensed via said communication circuitry.

2. A system for monitoring a railcar, comprising:
  a plurality of sensor devices located on the railcar for monitoring parameters or conditions of the railcar, each of said sensor devices being separate from one another and including a sensor for monitoring one of said parameters or conditions of the railcar;
  said plurality of sensor devices including at least one temperature sensor device having:
    a housing;
    a temperature sensor in thermal communication with an item of the railcar for which the temperature is being monitored, which item is external to said housing;
    electrical circuitry in communication with said temperature sensor for obtaining information regarding the temperature being sensed, said electrical circuitry positioned within said housing;
    a power source electrically connected to said electrical circuitry for providing power thereto, said power source positioned within said housing;
    a communication device capable of broadcasting information regarding the temperature sensed via wireless communication, said communication device positioned within said housing; and
  a communication management unit, mounted on the railcar, capable of two way wireless communication with each of said plurality of sensor devices for receiving information therefrom, said communication management unit having a wireless communication device for broadcasting information about the parameter or condition being monitored.

3. The system of claim 2 wherein said communication management unit can make a determination of an alarm condition based on data collected by two or more of said sensor devices.

4. The system of claim 2 wherein each of said plurality of sensor devices is capable of exchanging data with other of said plurality of sensor devices and with said communication management unit.

5. A system for monitoring the operation of a railcar comprising:
  a. one or more sensor units mounted on said railcar, each of said sensor units monitoring an operating parameter of said railcar wherein each of said sensor units comprises a sensor, a power source, a processor, memory, communications circuitry, and software, stored in said memory and executed by said processor, said software performing the functions of collecting data from said sensor at periodic intervals; and
  b. a communication management unit, mounted on said railcar, said communication management unit in wireless communication with said one or more sensor units;
  wherein said communication management unit applies heuristics to analyze data collected from said one or more sensor units (a) to determine if an actual failure exists and (b) to predict potential or imminent failures based on a statistical analysis of said collected data.

6. The system of claim 5 wherein said determination of an alarm condition can be made by one of said sensor units.

7. The system of claim 5 wherein said determination of an alarm condition can be made by said communication management unit based on data collected by two or more of said sensor units.

8. The system of claim 5 wherein each of said sensor units comprises:
  a. a sensor;
  b. a power source;
  c. a processor;
  d. memory;
  e. communications circuitry; and
  f. software, stored in said memory and executed by said processor, said software performing the functions of collecting data from said sensor at periodic intervals.

9. The system of claim 8 wherein said software further performs the function of:
  assessing the collected data to determine if an alarm condition exists; and
  communicating said alarm condition to said communication management unit via said communications circuitry; and managing the power consumption of said sensor unit by placing said sensor unit in a standby state and periodically awakening said sensor unit to collect data from said sensor and to transmit information regarding said operating parameter to said communication management unit via said communication circuitry.

10. The system of claim 5 wherein said one or more sensor units and said communication management unit are in wireless communication with each other and form a local area wireless network for said railcar.

11. The system of claim 10 wherein said local area network is a mesh network running the Time Synchronized Mesh Protocol to facilitate communications therebetween.

12. The system of claim 10 wherein said communication management unit is in wireless communications with communication management units on other railcars, forming a wide area network.

13. The system of claim 5 further comprising a base unit, said base unit being in wireless communication with said communication management unit, said based unit performing the functions of:
   a. collecting data and alarms from said communication management unit;
   b. displaying alarm conditions raised by said communication management unit; and
   c. determining high level alarms based on data and alarms collected from said communication management unit.

14. The system of claim 13 wherein said base unit is in wireless communication with multiple communication management units.

15. The system of claim 14 wherein said base unit uses distributed event processing to perform trend analysis based on alarms and data collected from one or more communication management units to determine if a high level alarm should be raised.

16. The system of claim 14 wherein said base unit applies heuristics to data collected from said one or more communication management units to determine if a high level alarm should be raised.

17. The system of claim 16 wherein said base unit and said one or more communication management units communicate with each other via a satellite communications capability or a cellular network capability.

18. The system of claim 5 wherein said sensor is selected from a group consisting essentially of temperature sensors, pressure sensors, strain sensors, load cell sensors, hand brake position sensors, magnetic sensors, vibration sensors, gyroscopes, acceleration sensors, hall effect sensors, piezio resistive microphones and switches.

19. The system of claim 5 wherein data and alarms may be relayed from said one or more communication management units to an on-train base unit via an off-train base unit.

20. The system of claim 5 wherein said alarm is determined using distributed event processing based on a comparison between current data and statistical models of behavior.

21. The system of claim 5 wherein said alarms are determined based on a comparison of currently collected data versus data collected over a pre-determined preceding time period.

22. The system of claim 5 wherein an alarm is raised based one or more of the following criteria:
   a. a pre-determined percentage of current data readings exceeds allowable peak readings;
   b. a pre-determined percentage of current data readings exceeds a determined value;
   c. a pre-determined percentage of current data readings exceeds a standard deviation from readings from the same railcar;
   d. a pre-determined percentage of current data readings exceeds a standard deviation from all railcars in the fleet; or
   e. the rate of change of current data readings exceeds a pre-determined threshold.

23. A monitoring device for monitoring temperature on a railcar, comprising:
   a housing mountable on a railcar;
   a temperature sensor configured to be in thermal communication with a portion of the railcar to be monitored for temperature, which portion is external to said housing;
   electrical circuitry in communication with said temperature sensor for obtaining information regarding the temperature being sensed, said electrical circuitry positioned within said housing;
   a power source electrically connected to said electrical circuitry for providing power thereto, said power source positioned within said housing; and
   a communication device capable broadcasting information regarding the temperature sensed, said communication device positioned within said housing;
   wherein the power consumption of said monitoring device is managed by placing said monitoring device in a standby state and periodically awakening said monitoring device to collect readings from said temperature sensor and to transmit the information regarding the temperature sensed via said communication circuitry.

24. The monitoring device of claim 23 wherein at least a section of said temperature sensor is disposed outside of and spaced from said housing to be capable of contacting the surface of the railcar for which the temperature is to be monitored.

25. The monitoring device of claim 23 wherein said circuitry is configured to apply heuristics to analyze data collected from said temperature sensor to determine if a problem exists.

26. The system of claim 2 wherein said communication management unit applies heuristics to analyze data collected from said one or more sensor devices (a) to determine if an actual failure exists and (b) to predict potential or imminent failures based on a statistical analysis of said collected data.

27. The system of claim 2 further comprising a second temperature sensor located on said railcar for measuring ambient air temperature, wherein said system uses information obtained from said second temperature sensor about the ambient temperature to calibrate the temperature data received from said first sensor regarding the item of the railcar being monitored.

28. The system of claim 2 wherein said communicating management unit is capable of communicating data and alarms to a remote location located off of the train of which the railcar is a part.

29. The system of claim 2 wherein the power consumption of each of said sensor devices is managed by placing each said sensor device in a standby state and periodically awakening said sensor device to collect readings from said sensor device and to transmit the information regarding the parameter or condition being sensed via said communication circuitry.

30. The system of claim 2 wherein said communication management unit and said plurality of sensor devices form a wireless mesh network for said railcar.

31. The system of claim 5 wherein the power consumption of each of said sensing units is managed by placing each sensing unit in a standby state and periodically awakening said sensing unit to collect readings from said sensor and to transmit information via said communications circuitry.

32. The system of claim 5 wherein said communication management unit is capable of communicating with a remote location located off of a train of which said railcar is a part.

* * * * *